United States Patent
Cherepinsky et al.

(10) Patent No.: US 10,415,993 B2
(45) Date of Patent: Sep. 17, 2019

(54) SYNTHETIC VISION AUGMENTED WITH MULTISPECTRAL SENSING

(71) Applicant: SIKORSKY AIRCRAFT CORPORATION, Stratford, CT (US)

(72) Inventors: Igor Cherepinsky, Sandy Hook, CT (US); Jason C. Derenick, Hamden, CT (US); Christopher Stathis, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/518,406

(22) PCT Filed: Oct. 13, 2015

(86) PCT No.: PCT/US2015/055316
§ 371 (c)(1),
(2) Date: Apr. 11, 2017

(87) PCT Pub. No.: WO2016/061096
PCT Pub. Date: Apr. 21, 2016

(65) Prior Publication Data
US 2017/0307402 A1    Oct. 26, 2017

Related U.S. Application Data

(60) Provisional application No. 62/063,517, filed on Oct. 14, 2014.

(51) Int. Cl.
*G01C 23/00* (2006.01)
*G06T 17/05* (2011.01)
(Continued)

(52) U.S. Cl.
CPC .......... *G01C 23/005* (2013.01); *G01C 23/00* (2013.01); *G06T 1/60* (2013.01); *G06T 15/005* (2013.01);
(Continued)

(58) Field of Classification Search
CPC ....... G06T 19/00; G06T 17/20; G06T 11/001; G06T 15/04; G06T 11/60; G06T 17/05;
(Continued)

(56) References Cited

U.S. PATENT DOCUMENTS

| 6,664,529 B2 | 12/2003 | Pack et al. |
| 6,747,649 B1 | 6/2004 | Sanz-Pastor et al. |

(Continued)

FOREIGN PATENT DOCUMENTS

CN    103364781 A    10/2013

OTHER PUBLICATIONS

Notification of Transmittal of the International Search Report for International Appln. No. PCT/US2015/055316; Date of Filing: Oct. 13, 2015; dated Dec. 30, 2015; 7 pages.

(Continued)

*Primary Examiner* — Ke Xiao
*Assistant Examiner* — Andrew Shin
(74) *Attorney, Agent, or Firm* — Cantor Colburn LLP

(57) ABSTRACT

A method for augmenting a synthetic vision system of a vehicle includes receiving, with a processor, signals indicative of real-time sensor data of a terrain for the vehicle via one or more acquisition devices; creating, with the processor, a terrain mesh of the terrain in response to the receiving of the sensor data; correlating, with the processor, the terrain mesh with preloaded terrain data of the terrain; creating, with the processor, a multispectral image of the terrain in response to the correlating the terrain mesh with the pre-
(Continued)

loaded data; and texturing, with the processor, the terrain mesh for display on a display device.

12 Claims, 3 Drawing Sheets

(51) Int. Cl.
*G06T 19/20* (2011.01)
*G06T 15/04* (2011.01)
*G06T 17/20* (2006.01)
*G06T 1/60* (2006.01)
*G06T 15/00* (2011.01)
*G09G 5/36* (2006.01)

(52) U.S. Cl.
CPC .............. *G06T 15/04* (2013.01); *G06T 17/20* (2013.01); *G09G 5/36* (2013.01)

(58) Field of Classification Search
CPC ....... G06T 3/4038; G06T 7/0028; G06T 1/60; G06T 15/005; G06T 19/20; G06T 2207/10032; G06T 2207/10036; G06T 2207/30261; G06T 2207/20221; G06T 7/30; G06T 7/32; G06T 7/70; G09G 5/14; G09G 2340/10; B60R 19/483; B60R 2300/102; B60R 2300/105; B60R 2300/301; B60R 2300/8093; G01C 23/00; G01C 23/005
USPC ....... 345/419, 423, 581, 582, 619, 629, 634, 345/639; 382/109, 113, 284, 294
See application file for complete search history.

(56) References Cited

U.S. PATENT DOCUMENTS

| | | | |
|---|---|---|---|
| 7,440,591 | B1 | 10/2008 | McCusker |
| 7,747,364 | B2 | 6/2010 | Roy et al. |
| 8,314,816 | B2 | 11/2012 | Feyereisen et al. |
| 8,615,337 | B1 * | 12/2013 | McCusker ............ G01C 21/20 701/1 |
| 2005/0232512 | A1 | 10/2005 | Luk et al. |
| 2006/0061566 | A1 | 3/2006 | Verma et al. |
| 2006/0055628 | A1 | 6/2006 | Sanders-Reed et al. |
| 2008/0208468 | A1 | 8/2008 | Martin |
| 2009/0125236 | A1 * | 5/2009 | Fontaine ............ G05D 1/0646 701/301 |
| 2010/0220189 | A1 * | 9/2010 | Yanagi ..................... B60R 1/00 348/148 |
| 2012/0007979 | A1 | 1/2012 | Schneider et al. |
| 2013/0106832 | A1 | 5/2013 | Meeker et al. |
| 2013/0188878 | A1 | 7/2013 | Kacenjar |
| 2013/0257852 | A1 | 10/2013 | Meeker et al. |
| 2015/0078123 | A1 * | 3/2015 | Batcheller ............ G01S 17/89 367/7 |

OTHER PUBLICATIONS

Written Opinion of the International Searching Authority for International Appln. No. PCT/US2015/055316; International Filing Date: Oct. 13, 2015; dated Dec. 30, 2015; 5 pages.
International Preliminary Report on Patentability; International Application No. PCT/US2015/055316; International Filing Date: Oct. 13, 2015; dated Apr. 18, 2017; pp. 1-6.
Dennis J. Yelton et al., "Processing System for an Enhanced Vision System", Proceedings of SPIE, Enhanced and Syntheic Vision, vol. 5424, 2004 pp. 163-176.
Extended European Search Report issued in EP Application No. 15851355.6 dated May 18, 2018, 10 pages.

* cited by examiner

SYNTHETIC VISION AUGMENTED WITH MULTISPECTRAL SENSING

CROSS REFERENCE TO RELATED APPLICATIONS

This application is a National Stage application of PCT/US2015/055316, filed Oct. 13, 2015, which claims the benefit of U.S. Provisional Application No. 62/063,517, filed Oct. 14, 2014, both of which are incorporated by reference in their entirety herein.

FIELD OF THE INVENTION

The subject matter disclosed herein relates generally to the field of instrumentation for a vehicle, and to a system and method for augmenting an existing synthetic vision database for navigation and obstacle avoidance in a rotary-wing aircraft.

DESCRIPTION OF RELATED ART

Typically, synthetic vision systems on aircraft rely on on-board databases of objects, e.g., terrain, obstacles, etc., to render an image of an environment, external to the aircraft, into visual form for display to a pilot on a primary flight display. The on-board object database can be an on-board static terrain database. However, typical synthetic vision systems render an image through on on-board synthetic vision databases that are infrequently updated or do not account for real-world changes of objects. Also, augmented synthetic vision systems, such as forward looking infrared (FLIR) technology, are not integrated with the on-board synthetic vision database. Prior art synthetic vision systems have attempted to integrate both types of systems but have resulted in an image overlay being displayed over the synthetic image. A system for augmenting an existing synthetic vision database on a vehicle with multispectral sensor data is desired.

BRIEF SUMMARY

According to one aspect of the invention, a method for augmenting a synthetic vision system of a vehicle includes receiving, with a processor, signals indicative of real-time sensor data of a terrain for the vehicle via one or more acquisition devices; creating, with the processor, a terrain mesh of the terrain in response to the receiving of the sensor data; correlating, with the processor, the terrain mesh with preloaded terrain data of the terrain; creating, with the processor, a multispectral image of the terrain in response to the correlating the terrain mesh with the preloaded data; and texturing, with the processor, the terrain mesh for display on a display device.

In addition to one or more of the features described above, or as an alternative, further embodiments could include the receiving of the sensor data further comprises receiving real-time terrain information external to the vehicle.

In addition to one or more of the features described above, or as an alternative, further embodiments could include correlating the terrain mesh for features of known obstacles in the sensor data with similar features of known obstacles in the preloaded terrain data.

In addition to one or more of the features described above, or as an alternative, further embodiments could include correlating the terrain mesh for determining obstacles in the sensor data with missing obstacles in the preloaded terrain data.

In addition to one or more of the features described above, or as an alternative, further embodiments could include correlating the terrain mesh with one or more probabilistic sensor models.

In addition to one or more of the features described above, or as an alternative, further embodiments could include determining a weighting factor for one or more of the known obstacles in response to the correlating the terrain mesh.

In addition to one or more of the features described above, or as an alternative, further embodiments could include creating the terrain mesh that represents a three-dimension (3-D) image of the terrain with topographical features below the vehicle.

According to another aspect of the invention, a system for augmenting a synthetic vision system of a vehicle includes one or more sensors configured to receive signals indicative of terrain information for the vehicle; and a computer operably connected to the one or more sensors and configured to: receive signals indicative of real-time sensor data of a terrain for the vehicle via one or more acquisition devices; create a terrain mesh of the terrain in response to the receiving of the sensor data; correlate the terrain mesh with preloaded terrain data of the terrain; create a multispectral image of the terrain in response to the correlating the terrain mesh with the preloaded data; and texture the terrain mesh for display on a display device.

In addition to one or more of the features described above, or as an alternative, further embodiments could include the processor configured to receive real-time terrain information external to the vehicle.

In addition to one or more of the features described above, or as an alternative, further embodiments could include the processor configured to correlate the terrain mesh for features of known obstacles in the sensor data with similar features of known obstacles in the preloaded terrain data.

In addition to one or more of the features described above, or as an alternative, further embodiments could include the processor configured to correlate the terrain mesh for determining obstacles in the sensor data with missing obstacles in the preloaded terrain data.

In addition to one or more of the features described above, or as an alternative, further embodiments could include the processor configured to correlate the terrain mesh with one or more probabilistic sensor models.

In addition to one or more of the features described above, or as an alternative, further embodiments could include the processor configured to determine a weighting factor for one or more of the known obstacles in response to the correlating the terrain mesh.

In addition to one or more of the features described above, or as an alternative, further embodiments could include the processor configured to create the terrain mesh that represents a three-dimension (3-D) image of the terrain with topographical features below the vehicle.

Technical effects of embodiments include rendering an environment external to a vehicle on synthetic vision display that uses multispectral information to augment information about the environment stored in a synthetic vision database for navigation and obstacle avoidance during travel of the vehicle, including travel in degraded visual environments.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
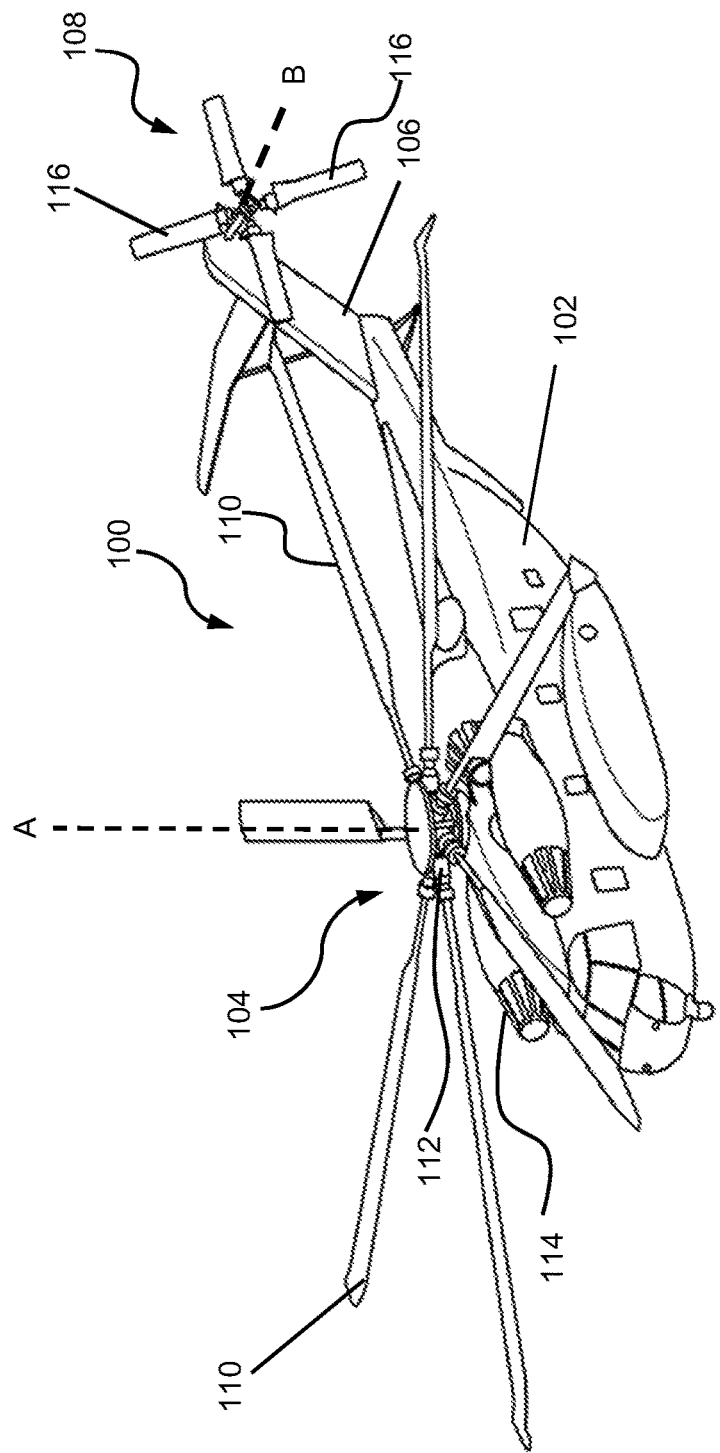
FIG. 1 is a perspective view of an exemplary aircraft for use with embodiments of the invention.

Referring now to the drawings, FIG. 1 illustrates a general perspective view of an exemplary vehicle in the form of a vertical takeoff and landing (VTOL) rotary-wing aircraft 100 for use with embodiments of the invention. In an embodiment, the aircraft 100 uses a synthetic vision algorithm 204 (FIG. 2) for augmenting an on-board synthetic vision database for displaying 3-D terrain information to a pilot on a display device including detached and attached objects surrounding aircraft 100. Attached objects include portions of natural and man-made terrain that are anchored to the ground, and detached objects include portions of natural or man-made objects that are not attached to the ground. For example, a bridge would include pillars that are considered attached objects and spans between pillars are considered detached objects. Other examples of detached objects include telephone or power lines, structural overhangs, tree canopies, and the like. The synthetic vision algorithm 204 (FIG. 2) can receive real-time multispectral data for augmenting terrain data in an existing on-board synthetic vision database in order to enhance navigation and added safety in degraded visual environments.

As illustrated, rotary-wing aircraft 100 includes an airframe 102 having a main rotor assembly 104 and an extending tail 106 which mounts an anti-torque system, such as a tail rotor assembly 108. In embodiments, the anti-torque system may include a translational thrust system, a pusher propeller, a rotor propulsion system, or similar. The main rotor assembly 104 includes a plurality of rotor blades 110 mounted to a rotor hub 112 that rotates about axis A. Also, tail rotor assembly 108 includes a plurality of rotor blades 116 that rotates about axis B, which is orthogonal to the plane of rotation of blades 116. Main rotor assembly 104 and tail rotor assembly 108 are driven to rotate by one or more engines 114 through one or more gearboxes (not shown). Although a particular rotorcraft is illustrated and described in the disclosed embodiments, other configurations and/or machines, such as manned or unmanned fixed wing and rotary wing aircraft, land-borne vehicles for fire, security, and search and rescue, ships, and submarines can also benefit from embodiments of the invention. For simplicity, embodiments are described with reference to "aircraft".

Figure 2:
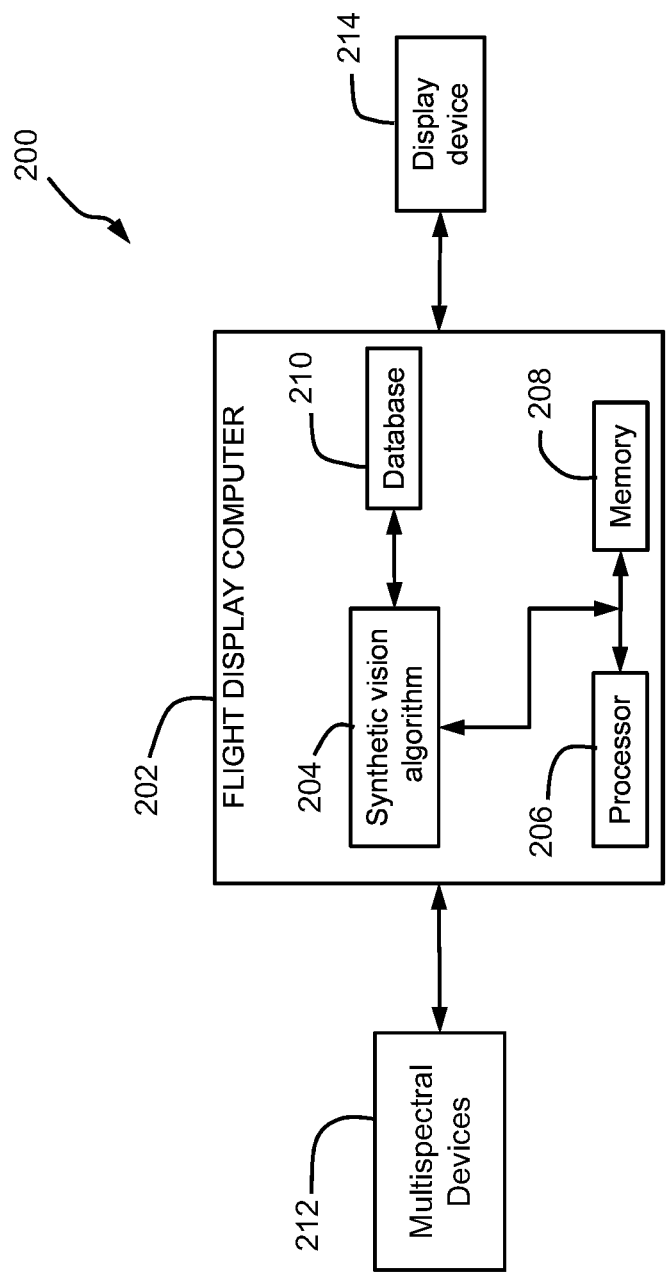
FIG. 2 is a system architecture block diagram according to an embodiment of the invention.

FIG. 2 illustrates a schematic block diagram of a system 200 on board aircraft 100 that is used to implement the embodiments described herein. In an embodiment, system 200 uses a synthetic vision algorithm 204 to augment an on-board synthetic vision database 210 through real-time multispectral sensors. Particularly, sensor data from a plurality of "image" acquisition devices 212 (hereinafter "acquisition devices 212") are located on aircraft 100 for capturing data from a terrain or environment external to aircraft 100. For clarity, "image" is used to represent sensor data that is acquired on-board aircraft 100 such as, e.g., Light Detection And Ranging (LIDAR), or radio waves, e.g., acquired from RAdio Detection And Ranging (RADAR). Real-time terrain information is used by flight display computer 202 for augmenting pre-loaded and/or pre-determined terrain data of the environment in an on-board synthetic vision database 210. In embodiments, the plurality of acquisition devices 212 can include long-range acquisition devices with a perception range of several miles such as, e.g., 3-D RADAR, telescope cameras, color video camera, multispectral camera, Time-of-flight 3D camera; medium range acquisition devices with a perception range from about 10 meters to about 1000 meters such as, e.g., pan-tilt-zoom (PTZ) cameras, single visible or infrared cameras, and medium range LIDAR; and short range acquisition devices with a perception range of less than 1 meter such as, e.g., short-range high definition LIDAR, or stereo cameras. Other acquisition devices 212 can include short wave infrared (SWIR) camera or long range infrared camera (LWIR) that can also be used in inclement weather conditions like fog, snow, or rain.

Also shown in FIG. 2, system 200 includes flight display computer 202 that executes instructions for implementing synthetic vision algorithm 204. Aircraft computer 202 receives sensor data on an environment external to aircraft 100 from the multispectral sensors associated with the plurality of acquisition devices 212. Computer 202 includes a memory 208 that communicates with a processor 206. The memory 208 may store synthetic vision algorithm 204 as executable instructions that is executed by processor 206. The instructions mat be stored or organized in any manner and at any level of abstraction, such as in connection with the execution of synthetic vision algorithm 204. Processor 206 may be any type of processor (such as central processor unit (CPU) or general processor unit (GPU)), including a general purpose processor, a digital signal processor, a microcontroller, an application specific integrated circuit (ASIC), a field programmable grid array (FPGA), or the like. In an embodiment, processor 206 may include one or more image processors for processing the associated image data from the acquisition devices 212 using one or more processing algorithms to produce one or more processed signals. Also, in embodiments, memory 208 may include random access memory (RAM), read only memory (ROM), or other electronic, optical, magnetic, or any other computer readable medium onto which is stored the synthetic vision algorithm 204 described below.

System 200 may include a synthetic vision database 210. Database 210 can be used to store pre-loaded terrain/environment data that includes location and elevations of natural and man-made terrain at locations in which aircraft 100 is operating. As mentioned above in FIG. 1, stored terrain data can represent at least two types of items in the physical environment surrounding the aircraft: detached objects and attached objects. Database 210 may also store real-time terrain data (e.g., detached and attached objects) acquired by acquisition devices 212. The data stored in database 210 may be based on one or more other algorithms or processes for implementing synthetic vision algorithm 204. For example, in some embodiments, data stored in database 210 may be a result of processor 206 having subjected sensor data or preloaded data to one or more filtration processes. Database 210 may be used for any number of reasons. For example, database 210 may be used to temporarily or permanently store data, to provide a record or log of the data stored therein for subsequent examination or analysis, etc. In some embodiments, database 210 may store a relationship between data, such as one or more links between data or sets of data acquired through the various acquisition devices 212 on board aircraft 100. System 200 may include a display device 214 coupled to computer 202. Display device 214 may include any device or apparatus suitable for displaying various type of computer generated symbols and information representing for example, pitch, heading, flight path, air speed, altitude, landing information, waypoints, targets, obstacles, and terrain objects in an integrated form.

Figure 3:
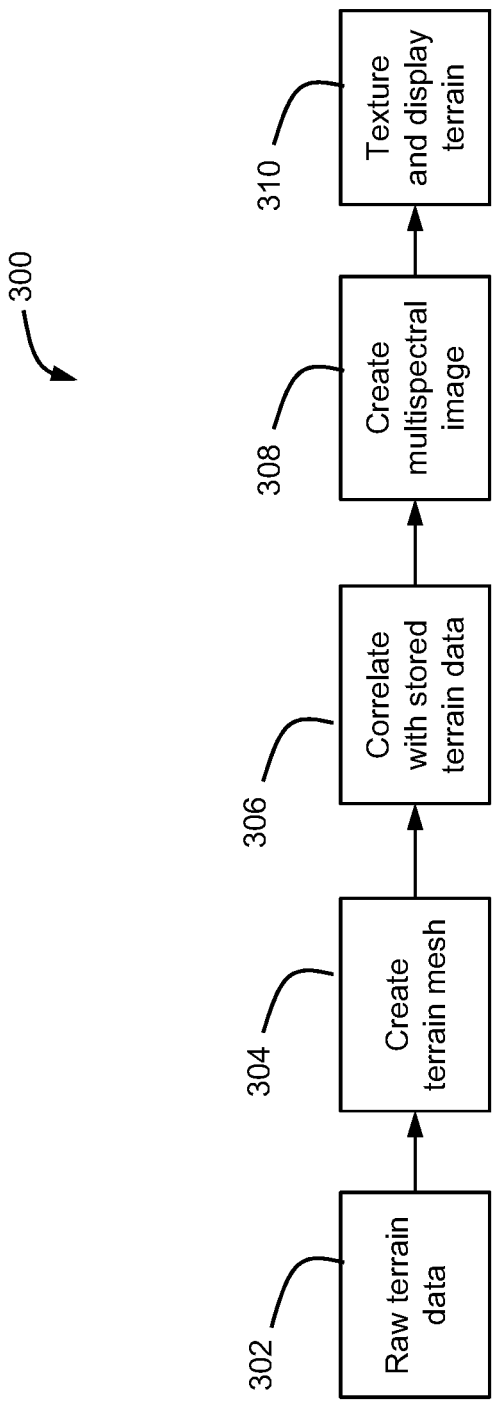
FIG. 3 is a data flow diagram according to an embodiment of the invention.

FIG. 3 illustrates an exemplary data flow diagram 300 that is performed by processor 206 (FIG. 2) for implementing synthetic vision algorithm 204 (FIG. 2) according to an embodiment of the invention, and, as such, FIG. 2 is also referenced in the description of data flow diagram 300 of FIG. 3. Particularly, data flow diagram 300 depicts a multispectral approach that is implemented by synthetic vision algorithm 204, which uses data fusion to correlate/augment real-time terrain information (i.e., sensor data from multispectral sensors) with preloaded terrain information from an on-board synthetic vision database for display to a pilot for navigation, obstacle avoidance, and the like.

Data flow diagram 300 begins at 302 where raw terrain data of the terrain is acquired as sensor data in real-time from one or more acquisition devices 212 for processing by processor 206. In some non-limiting examples, algorithm 204 will select one or more acquisition devices 212 based on distance of aircraft 100 (FIG. 1) from a target or obstacle. In an embodiment, SWIR or LWIR cameras can be used during inclement weather conditions like fog, snow, or rain. The sensor data for acquisition devices 212 may be low-quality due to variations in lighting, distance, and image enhancement algorithms such as edge preserving de-noising, contrast enhancement, and sharpening may be applied to the sensor data before further processing by processor 206.

In 304, a terrain mesh of the sensor data is created. A terrain mesh is a representation of a 3-D terrain having topographical features of the surface (e.g., a 3-D heightmap of topographical features) over which the aircraft 100 is traveling.

In 306, the terrain mesh is correlated with pre-loaded data of the terrain in synthetic vision database 210. The terrain mesh is correlated in order to refine sensor data acquired from acquisition devices 212 and/or to augment the terrain data in synthetic vision database 210 with information such as, e.g., terrain elevation and/or new obstacles not present in synthetic vision database 210. In an example, a plurality of probabilistic sensor models are applied to the sensor data associated with each acquisition device 212. Each probabilistic sensor model is associated with its own sensor data acquired from a respective acquisition device 212. The probabilistic sensor model is used to correlate sensor data for features (e.g., terrain elevation) of known obstacles in the sensor data with similar features of known obstacles in preloaded terrain data from synthetic vision database 210. In addition to the correlation of the features, or alternatively, probabilistic sensor model can also correlate new objects found in real-time sensor data with preloaded terrain data in synthetic vision database 210 such as, e.g., poles, wires, and structural overhangs that are not present in the preloaded data of synthetic vision database 210. A weighting factor for features identified in the sensor data is determined. The weighting factor can be used by algorithm 204 to denoise sensor data for objects with respect to similar preloaded objects in synthetic vision database 210. In embodiments, the probabilistic sensor model is continuously refined through sensor data acquired from known objects.

In 308, output from probabilistic sensor models are combined to produce a multispectral image of the terrain. In 310, multispectral image is applied to the terrain mesh from 304 in order to texture the terrain mesh and display a texture map representing the terrain on display device 214. For example, the multispectral image is applied to fill in additional details of objects in the terrain mesh including presenting objects that are not present in the preloaded data of synthetic vision database 210. The processed terrain representation that is textured is presented to a pilot on display device 214.

Benefits of the embodiments of the invention described herein include enhanced navigation, obstacle avoidance, and added safety in degraded visual environments. The embodiments relate to rendering an environment external to a vehicle on a synthetic vision display that uses multispectral information to augment information about the environment stored in a synthetic vision database.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangements not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for augmenting a synthetic vision system of a vehicle, comprising:
    selecting one or more acquisition devices of a plurality of acquisition devices of the vehicle to capture data based on a distance of the vehicle from a target;
    receiving, with a processor, signals indicative of real-time sensor data of a terrain for the vehicle via the one or more acquisition devices;
    creating, with the processor, a terrain mesh of the terrain in response to the receiving of the sensor data;
    correlating, with the processor, the terrain mesh with preloaded terrain data of the terrain, wherein correlating the terrain mesh with preloaded terrain data includes applying a plurality of probabilistic sensor models to the sensor data, wherein each of the plurality of probabilistic sensor models is associated with sensor data acquired from a respective acquisition device;
    creating, with the processor, a multispectral image of the terrain in response to the correlating the terrain mesh with the preloaded data; and
    texturing, with the processor, the terrain mesh for display on a display device.

2. The method of claim 1, wherein the receiving of the sensor data further comprises receiving real-time terrain information external to the vehicle.

3. The method of claim 1, further comprising correlating the terrain mesh for features of known obstacles in the sensor data with similar features of known obstacles in the preloaded terrain data.

4. The method of claim 3, further comprising determining a weighting factor for one or more of the known obstacles in response to the correlating the terrain mesh.

5. The method of claim 1, further comprising correlating the terrain mesh for determining obstacles in the sensor data with missing obstacles in the preloaded terrain data.

6. The method of claim 1, further comprising creating the terrain mesh that represents a three-dimension (3-D) image of the terrain with topographical features below the vehicle.

7. A system for augmenting a synthetic vision system of a vehicle, comprising:
one or more sensors configured to receive signals indicative of terrain information for the vehicle; and
a computer operably connected to the one or more sensors and configured to:
select one or more acquisition devices of a plurality of acquisition devices of the vehicle to capture data based on a distance of the vehicle from a target;
receive signals indicative of real-time sensor data of a terrain for the vehicle via the one or more acquisition devices;
create a terrain mesh of the terrain in response to the receiving of the sensor data;
correlate the terrain mesh with preloaded terrain data of the terrain by applying a plurality of probabilistic sensor models to the sensor data, wherein each of the plurality of probabilistic sensor models is associated with sensor data acquired from a respective acquisition device;
create a multispectral image of the terrain in response to the correlating the terrain mesh with the preloaded data; and
texture the terrain mesh for display on a display device.

8. The system of claim 7, wherein the processor is configured to receive real-time terrain information external to the vehicle.

9. The system of claim 7, wherein the processor is configured to correlate the terrain mesh for features of known obstacles in the sensor data with similar features of known obstacles in the preloaded terrain data.

10. The system of claim 7, wherein the processor is configured to correlate the terrain mesh for determining obstacles in the sensor data with missing obstacles in the preloaded terrain data.

11. The system of claim 7, wherein the processor is configured to determine a weighting factor for one or more of the known obstacles in response to the correlating the terrain mesh.

12. The system of claim 7, wherein the processor is configured to create the terrain mesh that represents a three-dimension (3-D) image of the terrain with topographical features below the vehicle.

* * * * *